(12) United States Patent
Kodimer

(10) Patent No.: US 10,244,144 B1
(45) Date of Patent: Mar. 26, 2019

(54) SYSTEM AND METHOD FOR DE-SKEW OF SCANNED IMAGES

(71) Applicants: Kabushiki Kaisha Toshiba, Minato-ku (JP); Toshiba TEC Kabushiki Kaisha, Shinagawa-ku (JP)

(72) Inventor: Marianne Kodimer, Huntington Beach, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/714,517

(22) Filed: Sep. 25, 2017

(51) Int. Cl.
*H04N 1/387* (2006.01)
*H04N 1/00* (2006.01)

(52) U.S. Cl.
CPC ....... *H04N 1/3878* (2013.01); *H04N 1/00809* (2013.01); *H04N 1/00453* (2013.01); *H04N 1/00816* (2013.01); *H04N 2201/0094* (2013.01)

(58) Field of Classification Search
CPC ............. H04N 1/3878; H04N 1/00809; H04N 2201/0094; H04N 1/00453; H04N 1/00816
See application file for complete search history.

(56) References Cited

U.S. PATENT DOCUMENTS

| | | | | |
|---|---|---|---|---|
| 8,120,810 B2* | 2/2012 | Hamzy | ................ | H04N 1/3878 358/1.15 |
| 8,913,285 B1* | 12/2014 | Neubrand | ............ | H04N 1/3873 358/1.9 |
| 2005/0068583 A1* | 3/2005 | Gutkowski | .......... | H04N 1/3875 358/1.18 |
| 2009/0040569 A1* | 2/2009 | Hamzy | ................ | H04N 1/3873 358/488 |

* cited by examiner

*Primary Examiner* — Kent Yip
(74) *Attorney, Agent, or Firm* — Ulmer & Berne LLP

(57) ABSTRACT

A system and method for aligning concurrently scanned documents, such as receipts, is accomplished on a suitable digital computing device such as a multifunction peripheral. An intelligent controller having a processor and memory operates a scan engine. One or more documents are placed, character side down, on a scanner platen. Axis data is stored and corresponds with a defined orientation of the platen, and thus a defined orientation of a scan image. The controller isolates two or more image portions from the scan image with each image portion defined by a boundary corresponding to a document. The controller detects a linearly oriented image component associated with each document image portion and reorients each image portion to generally align in accordance with each linearly oriented image component and the axis data.

18 Claims, 5 Drawing Sheets

SYSTEM AND METHOD FOR DE-SKEW OF SCANNED IMAGES

TECHNICAL FIELD

This application relates generally to simultaneous photocopying of multiple documents. This application relates more particularly to automatically aligning or de-skewing images of individual documents within a single scan image.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Tangible documents can be scanned one at a time by lifting a scanner cover, placing a document on a platen, closing the cover and issuing a "scan," "fax" or "copy" instruction. In these instances, each scan or copy operation will typically result in one printed page or one electronic file per operation. A user may choose to have multiple pages, corresponding to multiple operations, combined in one electronic file. This is a typical operation when a scan is associated with a multiple page facsimile transmission. Scanners may also scan multiple document pages serially by use of an automated document feeder (ADF) on more capable devices.

SUMMARY

In accordance with an example embodiment of the subject application, a system and method for aligning concurrently scanned documents, such as receipts, is accomplished on a suitable digital computing device such as a multifunction peripheral. An intelligent controller having a processor and memory operates a scan engine. One or more documents are placed, character side down, on a scanner platen. Axis data is stored and corresponds with a defined orientation of the platen, and thus a defined orientation of a scan image. The controller isolates two or more image portions from the scan image with each image portion defined by a boundary corresponding to a document. The controller detects a linearly oriented image component associated with each document image portion and reorients each image portion to generally align in accordance with each linearly oriented image component and the axis data.

BRIEF DESCRIPTION OF THE DRAWINGS

Various embodiments will become better understood with regard to the following description, appended claims and accompanying drawings wherein:

DETAILED DESCRIPTION

Figure 1:
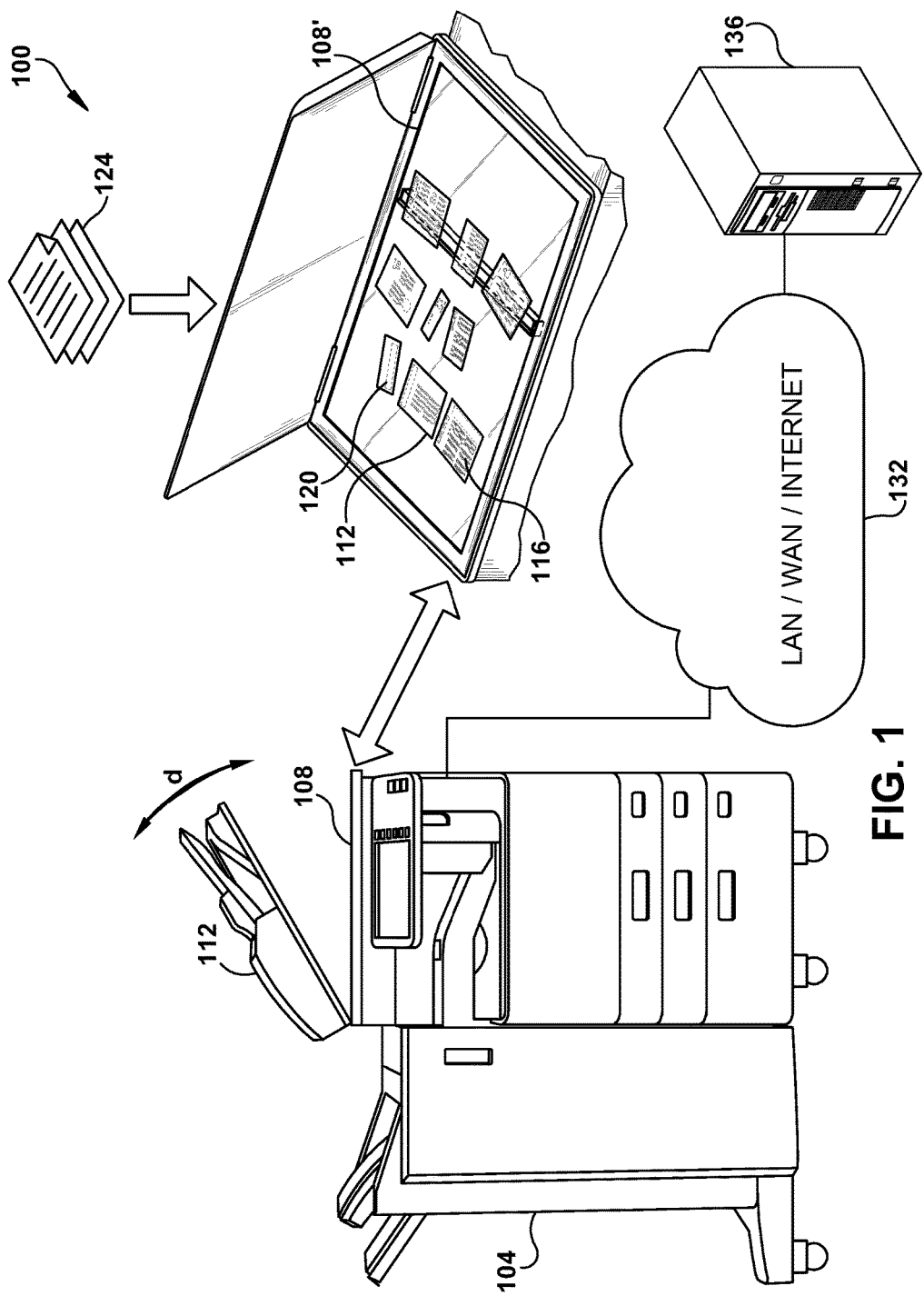
FIG. 1 an example embodiment of a document scanning system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In some copying, faxing or scanning operations, a user may wish to copy multiple documents with a single scan. This may be done in instances where multiple, smaller documents are related, such as scanning multiple receipts from a business trip for reimbursement.

When paper receipts are accumulated, it is advantageous to scan them into electronic form. Image files can be archived, such as by saving to a server. An electronic image may be faxed or converted into a facsimile transmission. Electronic images can also be sent to a network destination, such as by attaching them to an e-mail for electronic delivery. It is possible to sequentially scan each of a plurality of documents. This may be done by aligning them on an MFP platen, closing a device cover, and selecting a scan option on the device. Documents, particularly smaller documents such as receipts or pictures, are often flimsy, and may shift on a platen or even fall off entirely when a cover is lowered for copying. A scan image of a document inclusive of characters, such as text, may be placed through an optical recognition (OCR) algorithm to extract character data, such as cost reflected by the receipt. OCR programs may be adversely affected by character information on a scan image that is oriented incorrectly.

Documents come in an expansive number of sizes and shapes. It can be extremely problematic to align them on a platen for simultaneous copying. And, if this is attempted, a user must further position them as best possible so that all character information is in the same, or extremely close orientation. This is particularly important if an OCR operation is to be performed on an image embodying multiple documents.

In an example embodiment, a MFP scanner platen may have a size of approximately 12×18 inches. Much of that space may be unusable when multiple documents are co-aligned as best possible on a platen. Example embodiments described herein facilitate a user placing multiple documents on a platen for simultaneous scanning. There is no particular alignment requirement when the user simply places the documents at a slight distance from the other documents. Some documents can be vertical, some can be horizontal, and some may be placed at an angle. Thus, many more documents may be able to fit on a platen at once for simultaneous scanning, and a more efficient composite document scan results.

In accordance with the forgoing application, FIG. 1 illustrates an example embodiment of a document scanning system 100 that includes MFP 104. MFP 104 includes a scanner configured to scan documents disposed on platen 108. Scanner cover 112, illustrated as part of an automated document feeder (ADF), is moveable relative to platen 108 to cover documents placed on the platen during a scan operation. If a scan is made without a cover, areas not covered by a document are subject to extreme overexposure and will appear black on the resultant scan. Printouts of such scans require large amounts of extraneous toner. In the example embodiment, cover 112 is pivot-able relative to platen 108 in a direction "d." A perspective view of platen 108 is found at 108'. Platen 108' illustrates placement of individual documents 112, 116 and 120 from a group of documents 124. Documents 112, 116, 120 are suitably placed, image portion down, in any orientation and any relative position on platen 108. Multiple documents 112, 116, 120 can be positioned in any way to use as much of a surface of platen 108 as possible. Each document 112, 116, 120 need only be positioned so that there is spacing between it and other documents in group 124. Details of the resultant scanning operation are detailed further below.

MFP 104 is suitably connected to one or more digital devices by a network 132, suitably comprised of a local area network (LAN) or a wide area network (WAN) which may comprise the Internet, or any suitable combination thereof. Network 132 suitably provides for data communication between MFP 104 and one or more devices, such as server 136.

Figure 2:
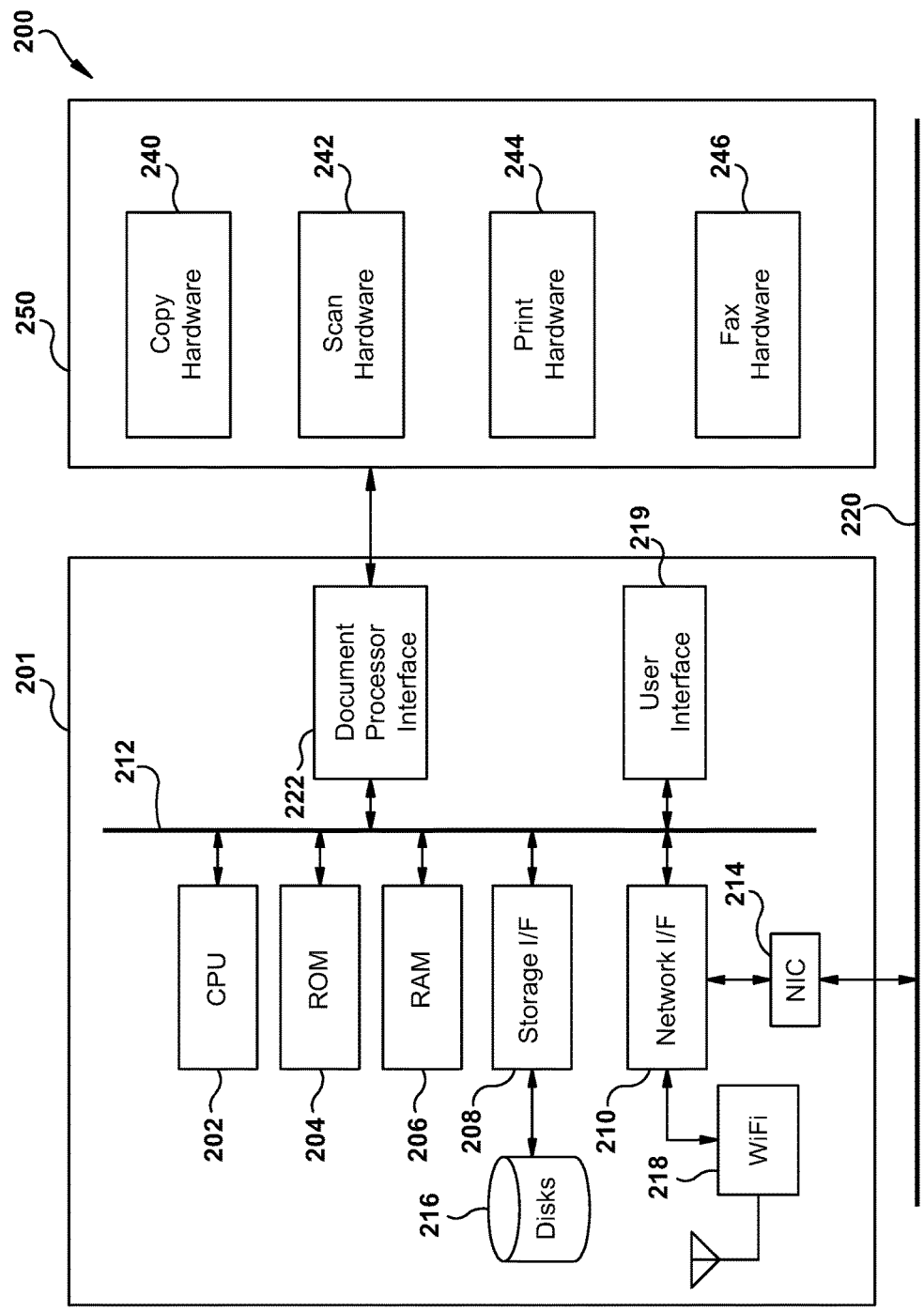
FIG. 2 is an example embodiment of a multifunction peripheral.

Turning now to FIG. 2 illustrated is an example embodiment of a networked digital device comprised of document rendering system 200 suitably comprised within an MFP, such as with MFP 104 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with BLUETOOTH Interface 221 which may be programmed to function as a device beacon as noted above.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250.

Figure 3:
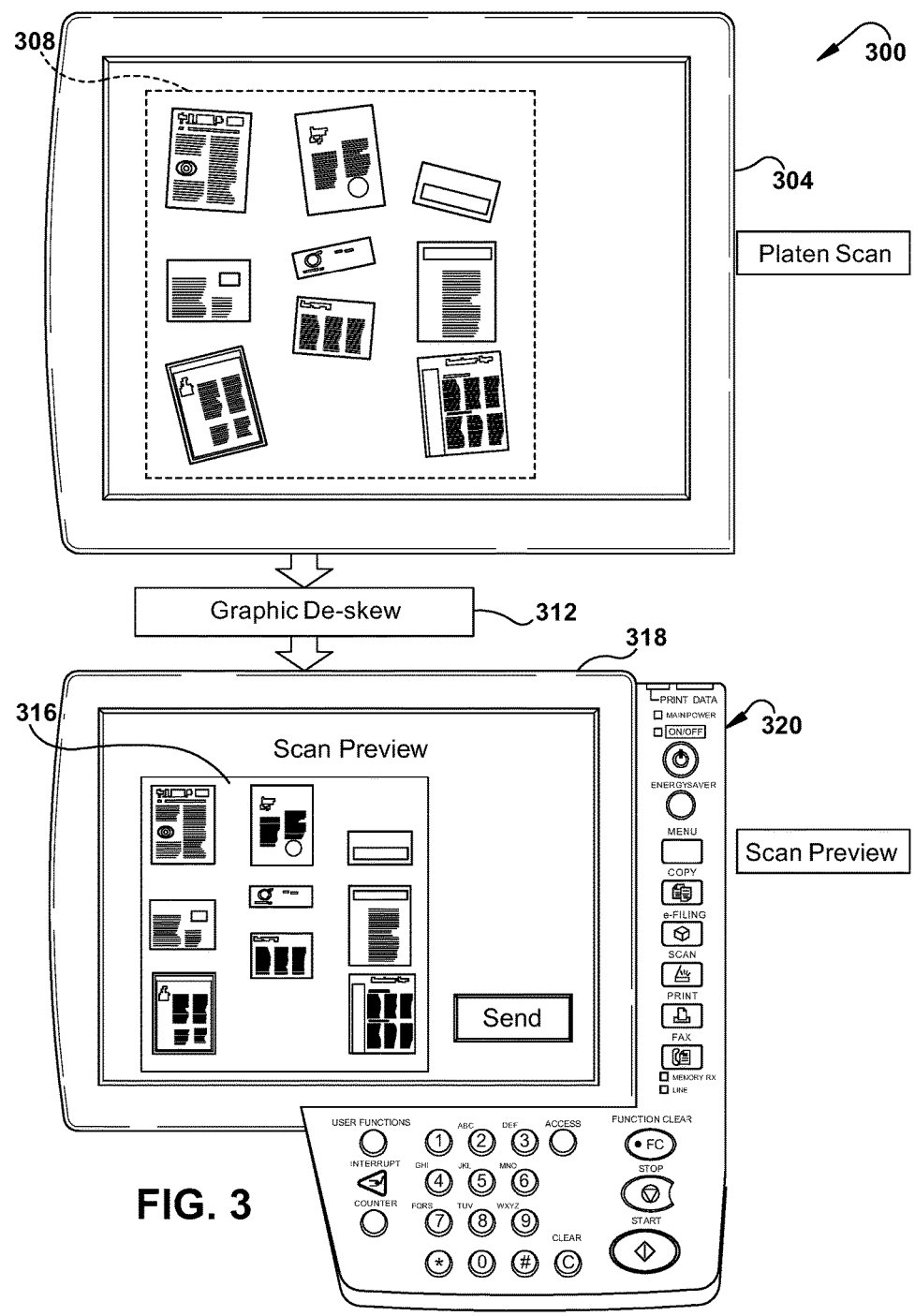
FIG. 3 is a flow diagram of example operations for user operation of a de-skewing system.

Referring next to FIG. 3, illustrated is a flow diagram 300 for user operation of a de-skewing system. A surface of platen 304 has placed upon it a plurality of documents 308. When a copy, scan or fax operation is completed, a resultant image of all documents is subjected to a de-skewing operation 312, suitably accomplished on an MFP controller. A scan preview 316 in which all documents are aligned is suitably generated on a display 318 on an MFP user interface 320. If the scan preview 316 is acceptable, the user suitably saves the image, prints the image, sends it to one or more network locations or e-mail addresses, or faxes it to one or more destinations.

Figure 4:
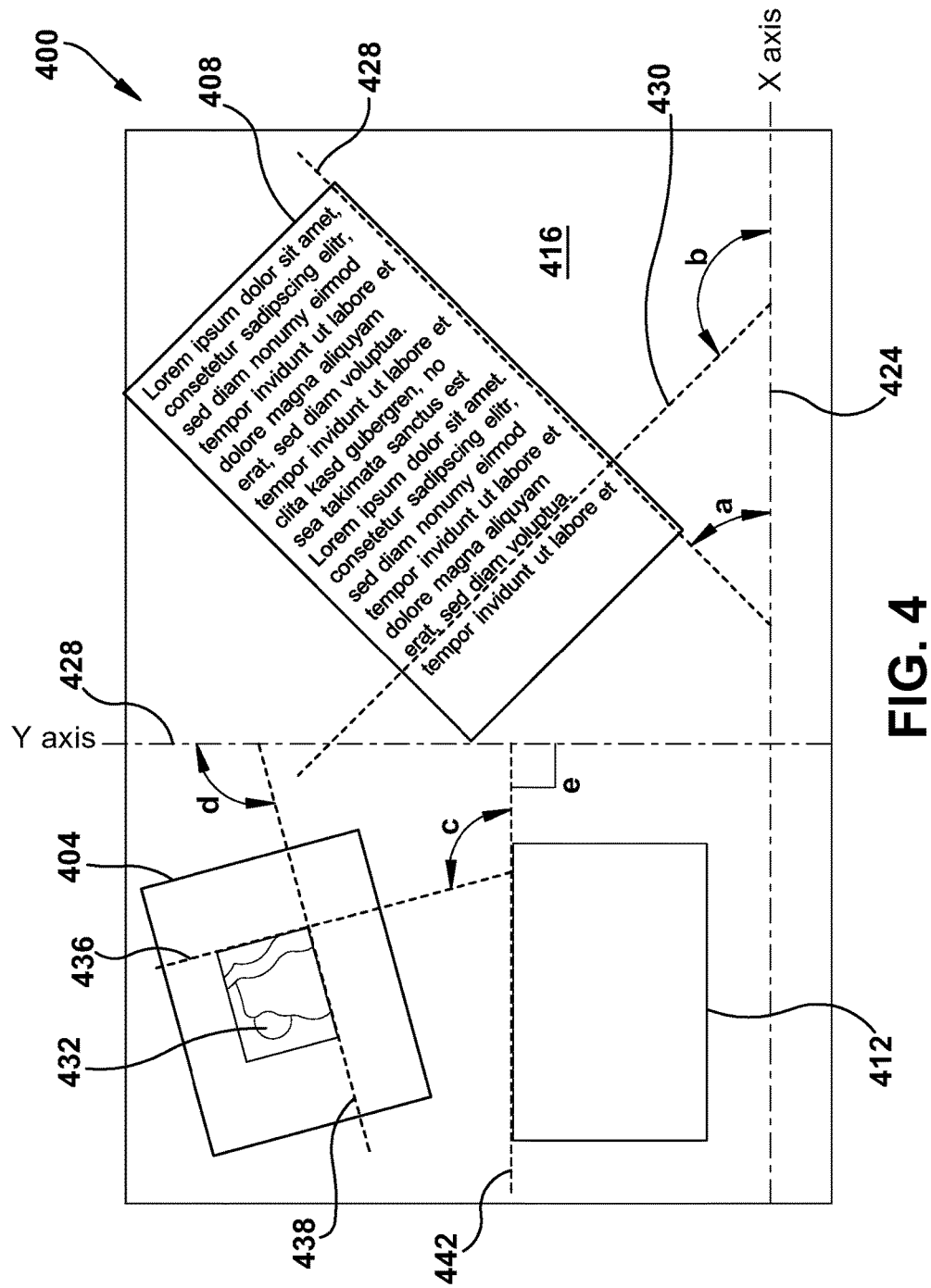
FIG. 4 is an example embodiment of linear element detection in a scan image.

FIG. 4 illustrates an example embodiment of a de-skewing system 400 wherein image portions 404, 408 and 412 of a scan image 416 correspond to documents placed on a surface of a platen. Scan image 416 is associated with a set base orientation, suitably stored in device memory, such as illustrated by perpendicular x axis 424 and y axis 428, suitably aligned with corresponding, parallel edges of the rectangular scan image 416. While rectangular coordinates are illustrated as conveniently associated with conventional, rectangular platens, it will be understood that any suitable coordinate system may be used, such as polar coordinates.

In the example embodiment of FIG. 4, one or more linear elements are detected for each of image portions 404, 408 and 412. Image portion 408 includes text, which can include characters, or glyphs, of any language. Text is generally linearly arranged in rows leaving a detectible linear relationship as evidenced by a line 430 which is defined by a text row. Text margins may also be used to define a linear orientation. In the example, text is right justified, allowing a line 428 to be determined by a right hand side of the text area. Alternatively, or in addition, a left margin may be used to define a line. Most character sets from typewriters, word processors and the like are generally left justified. Additionally, individual characters or glyphs may be used to detect the orientation. An intersection between determined lines 428, 430 and one or more defined axes of the image allows for determination of relative orientation, such as by angles a and b. It will be appreciated that any angular relationship is suitable to calculate orientation, either acute, obtuse or perpendicular. Two or more determined angular relationships between known axis orientations and extracted linear relationships allow for rotating an image such that it aligns with known axes. Optical character recognition (OCR) for characters in an image is more readily accomplished on aligned images. Once text has been subject to OCR processing, it can be readily determined if an image is inverted and a 180 degree rotation is suitably made when this is detected.

In the example of image 404, edges of a rectangular picture area 432 are suitably used to generate lines 436 and 438 to facilitate de-skewing in accordance with angles c and d relative to axes 424 and 428. Image portion 412 is rectangular and an edge is used to define line 442 which intersects y axis 428 at a right or 90 degree angle e. In this example, no de-skewing may be needed. However, any detectable image portion may be used to verify whether the image is rotated 90 degrees or 180 degrees, and if so, appropriate rotation is suitably accomplished.

Figure 5:
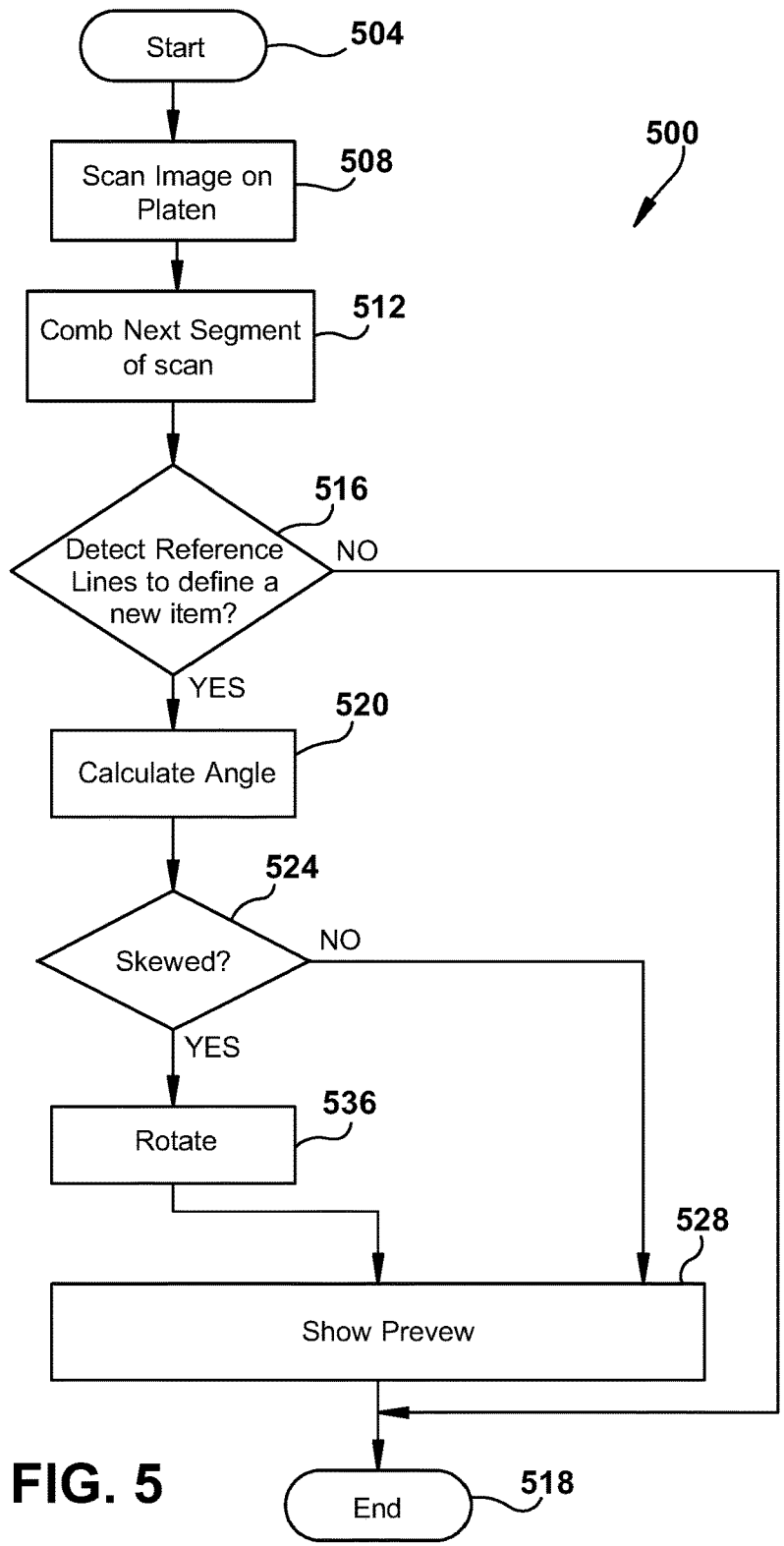
FIG. 5 is a flowchart of an example embodiment of a de-skew operation.

FIG. 5 illustrates a flowchart 500 of an example embodiment of a de-skew operation, suitably accomplished on a MFP or any suitable digital computing device. The process commences at block 504, and proceeds to block 508 when an image is scanned of one or more documents placed on a platen. Next, a combing of the resultant scaned image is completed at block 512 and lines and image portions defined and linear information extracted. If no reference lines are detected for scan image portions at block 516, the process terminates at block 518. If so, angles are calculated and compared to data corresponding to a defined axis relationship at block 520. If skewing is not detected at block 524, the resultant image is displayed as a preview image on a device display at block 528, after which the process ends at block 518. If skew is detected at block 524, appropriate reorientation is accomplished at block 536 before generating a preview image at block 528 and terminating at block 518.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
   a scan engine;
   a platen configured to receive a plurality of spaced apart, randomly oriented documents disposed on a surface thereof; and
   a controller including a processor and memory configured to operate the scan engine,
     the memory configured to store axis data corresponding to a defined orientation of the platen,
     the controller further configured to enable the scan engine to acquire image data corresponding to the plurality of documents disposed on the platen surface, the controller further configured to determine, from the image data, a plurality of image portions, each image portion defined by corresponding a document boundary,
     the controller further configured to detect a linearly oriented image component associated with each image portion, such detection including
       detection of characters or glyphs in at least one image portion,
       completion of optical character recognition on characters or glyphs in the at least one image portion, and
       a reorientation the at least one image portion in accordance with character alignment associated with a completed optical character recognition;
     the controller further configured to reorient each image portion to generally align in accordance with each linearly oriented image component and the axis data;
     the controller further configured to concurrently display the aligned image portions on a display; and
     the controller further configured to generate a user selected fax, e-mail or printing relative to the displayed image.

2. The multifunction peripheral of claim 1 wherein the controller is further configured to align the image portions in accordance with a calculated angle between each linearly oriented image component and platen axes defined by the axis data.

3. The multifunction peripheral of claim 1 wherein the linearly oriented image component is associated with an arrangement of glyphs on a surface of the document.

4. The multifunction peripheral of claim 1 wherein the linearly oriented image component is comprised of an edge associated with a boundary edge.

5. The multifunction peripheral of claim 1 wherein the controller is further configured to enable a print engine to print the image of the aligned image portions.

6. The multifunction peripheral of claim 1 wherein the controller is further configured to generate aligned image data comprising each aligned image portion.

7. A method comprising:
   placing a plurality of spaced apart, randomly oriented documents on a platen surface;
   retrieving axis data corresponding to a defined orientation of the platen from a memory;
   enabling a scan engine to acquire image data corresponding to the plurality of documents on the platen surface;
   determining, from the image data, a plurality of image portions, each image portion defined by an boundary corresponding to a document, wherein determining includes
     detecting characters or glyphs in at least one image portion,
     performing optical character recognition on characters or glyphs in the at least one image portion, and
     reorienting the at least one image portion in accordance with character alignment associated with a competed optical character recognition;
   detecting a linearly oriented image component associated with each document image portion;
   reorienting each image portion to generally align in accordance with each linearly oriented image component and the axis data;
   concurrently displaying the aligned image portions on a display; and
   faxing, e-mailing or printing the displayed image in accordance with a user selection.

8. The method of claim 7 further comprising aligning the image portions in accordance with a calculated angle between each linearly oriented image component and platen axes defined by the axis data.

9. The method of claim 8 wherein the linearly oriented image component is associated with an arrangement of glyphs on a surface of the document.

10. The method of claim 8 wherein the linearly oriented image component is comprised of an edge associated with a boundary edge.

11. The method of claim 7 further comprising printing the image of the aligned image portions by an associated print engine.

12. The method of claim 7 further comprising generating aligned image data comprising each aligned image portion.

13. A system comprising:
    a scanner having a platen configured to receive a plurality of spaced apart documents disposed on a surface thereof;
    the scanner configured to generate a scan image of the documents disposed on the platen surface; and
    a processor and associated memory, the processor configured to extract an image of each of the documents from the scan image in accordance with it associated boundary,
      the processor further configured to detect text or glyphs in at least one extracted image,
      the processor further configured to perform optical character recognition to the at least one extracted image,
      the processor further configured to determine an orientation of each extracted image relative to an orientation of the platen surface and an associated linear image component, the processor further configured to determine orientation of the at least one extracted image in accordance with an alignment of characters associated with a completed optical character recognition, the processor further configured to generate a revised scan image comprising a concurrent display of each extracted image in a substantially co-aligned orientation, and the processor further configured to render the revised scan image on an associated display.

14. The system of claim 13 wherein the processor is further configured to determine the orientation of each extracted image in accordance with a linear image component associated therewith.

15. The system of claim 14 wherein at least one linear image component is comprised of an extracted image boundary.

16. The system of claim 14 wherein at least one image component is comprised of an image element.

17. The system of claim 16 wherein the image element is comprised of a linear text orientation.

18. The system of claim 16 wherein the image element is comprised of an embedded image area.

* * * * *